United States Patent [19]

Wilson

[11] Patent Number: 4,458,738
[45] Date of Patent: Jul. 10, 1984

[54] PROTECTIVE DEVICE FOR VEHICLE SEAT, SEAT BACK AND STEERING WHEEL

[76] Inventor: Richard Wilson, 2535 Linda Ct., Glenview, Ill. 60025

[21] Appl. No.: 455,120

[22] Filed: Jan. 3, 1983

[51] Int. Cl.³ .......................... B62D 1/06; A47C 7/00
[52] U.S. Cl. .............................. 150/52 M; 150/52 K; 297/219; 297/229
[58] Field of Search .................... 150/52 K, 52 M; 224/275, 276; 297/229, 219; 296/136; 74/558, 558.5

[56] References Cited

U.S. PATENT DOCUMENTS

| 324,839 | 8/1885 | Hazen | 297/219 X |
| 1,781,034 | 11/1930 | Russell | 150/52 K X |
| 2,601,881 | 7/1952 | Roberlin, Sr. | 150/52 M |
| 2,688,998 | 9/1954 | Erickson et al. | 297/219 |
| 2,980,169 | 4/1961 | Campbell | 297/219 |
| 4,102,377 | 7/1978 | Ostrem | 150/52 M |
| 4,118,066 | 10/1978 | Ricke | 296/136 X |
| 4,287,621 | 9/1981 | Kertz | 150/52 M X |

FOREIGN PATENT DOCUMENTS

| 486612 | 7/1976 | Australia | 297/229 |
| 2622427 | 11/1977 | Fed. Rep. of Germany | 150/52 M |
| 1107236 | 8/1955 | France | 297/229 |

*Primary Examiner*—William Price
*Assistant Examiner*—Sue A. Weaver
*Attorney, Agent, or Firm*—Howard B. Rockman

[57] ABSTRACT

An apparatus for simultaneously protecting the steering wheel, seat and seat back of a vehicle such as an automobile from radical temperature changes which includes a cover composed of insulating material such as terry cloth or aluminized cotton material. The cover extends over the seat and seat back, and a portion of the cover comprises a pocket adapted to fit over the steering wheel. When the cover is removed from over the steering wheel, the portion of the cover which includes the pocket hangs straight down over the forward edge of the seat so as not to interfere with the controls for the vehicle while the driver is seated on the cover.

9 Claims, 4 Drawing Figures

U.S. Patent     Jul. 10, 1984     4,458,738
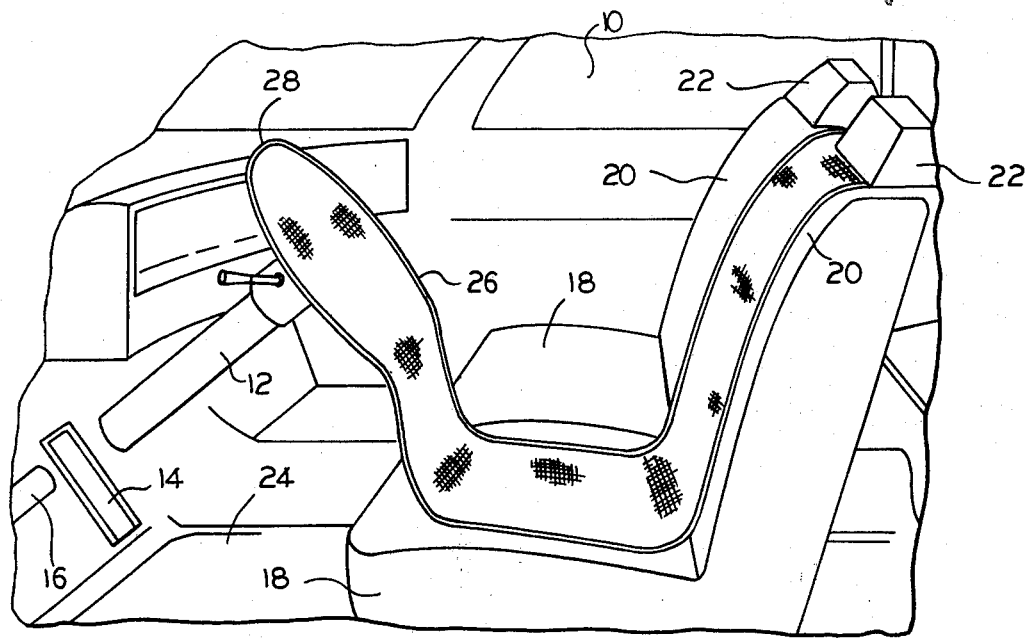
FIG.1
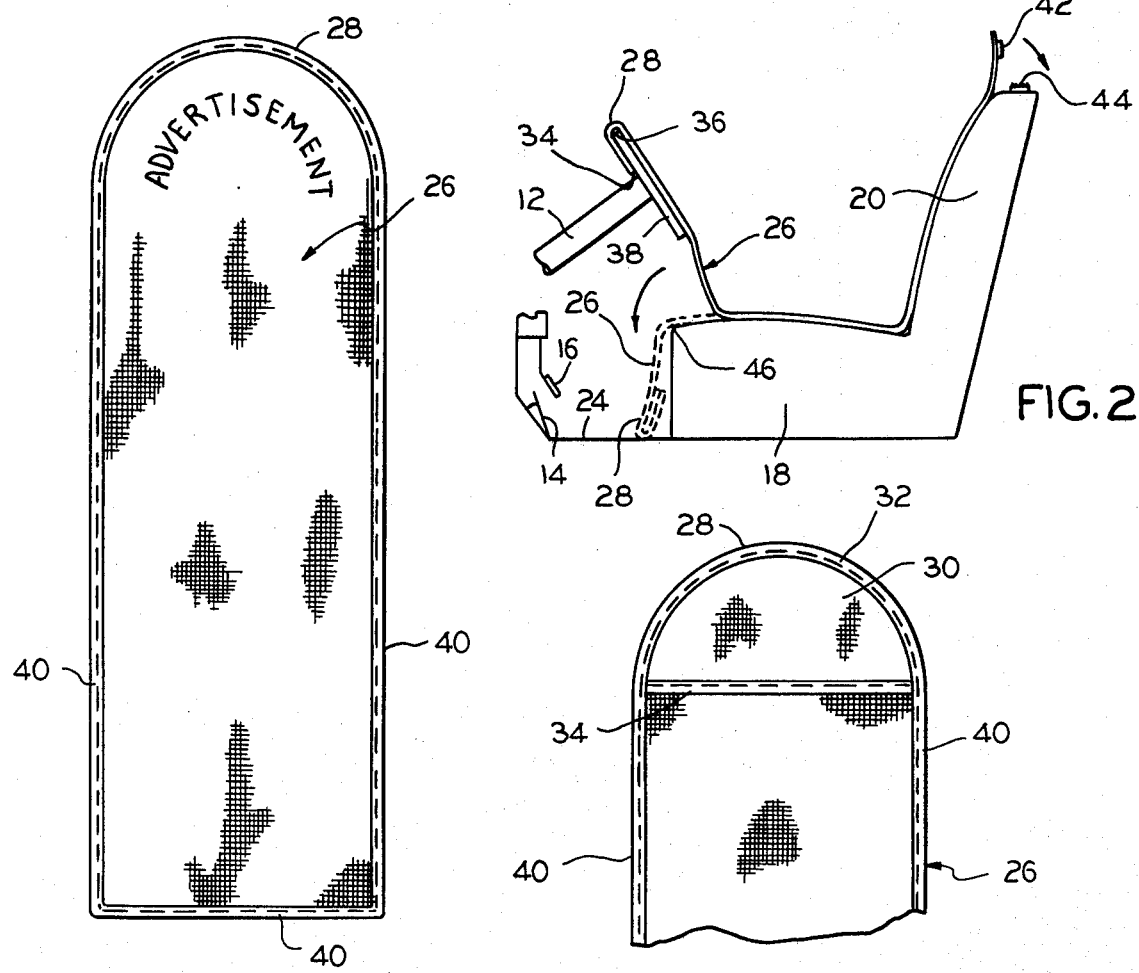
FIG.2
FIG.3
FIG.4

PROTECTIVE DEVICE FOR VEHICLE SEAT, SEAT BACK AND STEERING WHEEL

The present invention relates to a novel apparatus for protecting the seat, seat back and steering wheel of a vehicle such as an automobile, and more particularly to a one-piece protective cover which simultaneously covers the steering wheel, seat back, and seat of a vehicle, and which can be removed from the steering wheel while remaining in place on the seat and seat back to allow unencumbered use and control of the vehicle while the operator sits on the portion of the apparatus covering the seat and seat back.

BACKGROUND OF THE INVENTION

When vehicles such as automobiles are left in the sun for extended periods of time, several parts of the interior of the vehicle such as the seat, seat back and steering wheel become very hot, making the vehicle uncomfortable to operate. The seat becomes too hot to sit in, and the steering wheel cannot be grasped.

This problem is particularly acute with fleets of automobiles owned by rental agencies in the southern parts of the United States, and other warm climate areas. The vehicles normally sit in the hot sun all day long until they are rented, and the renter may be forced to operate an air conditioning system in the vehicle for several minutes before the seat and steering wheel cool down. This adds to the expense of operating the vehicle. Or the operator may be forced to drive with the windows open for a great length of time to cool down the interior of the car. This may cause an inconvenience if the vehicle contains material which may be blown away by the air moving through the open windows. In addition, the operator's hair and clothing may become mussed while driving with the windows open.

It is a primary object of the present invention, therefore, to provide a one-piece protective cover which simultaneously fits over the seat, seat back, and steering wheel of a vehicle to prevent these parts of the vehicle's interior from getting hot when the vehicle is left standing in the sun.

Another object of the present invention is to provide a cover for the steering wheel, seat, and seat back of a vehicle which can be removed from the steering wheel while remaining in place on the seat and seat back, whereby the portion of the cover removed from the steering wheel will not obstruct in any way the safe operation of the controls for the vehicle.

Yet another object of the present invention is to provide a one-piece cover for simultaneously protecting the steering wheel, seat and seat back of a vehicle from the heat of the sun, and which can be imprinted with advertising material to provide an inexpensive promotional give-away item for a business organization such as a car rental agency or the like.

Still another object of the present invention is to provide a cover for protecting the steering wheel, seat, and seat back of a vehicle from heating up when the vehicle is left standing in the sun, and which also can be utilized to prevent the steering wheel, seat, and seat back from becoming excessively and uncomfortably cold when the vehicle is left standing in cold weather for prolonged periods of time, particularly if the vehicle is equipped with leather seats.

These and other objects of the present invention will become more readily understood with reference to the following summary of the invention, brief description of the drawings, and description of the preferred embodiment.

SUMMARY OF THE INVENTION

An apparatus is provided for protecting the steering wheel, seat, and seat back of a vehicle from radical temperature variations including a piece of terry cloth, aluminized cotton material or like material adapted to extend over the seat back and seat of the vehicle, and having a portion extending over the forward edge of the seat, a pocket formed in the portion of material extending over the seat edge, which pocket is adapted to extend over and partially enclose the steering wheel. When removed from the steering wheel, the forward portion of the insulating material hangs down freely over the forward edge of the seat and does not interfere in any way with the floor-mounted controls for the vehicle.

BRIEF DESCRIPTION OF THE DRAWINGS

FIG. 1 is a view of the interior of a vehicle illustrating the location of the protective steering wheel, seat, and seat back cover of the present invention;

FIG. 2 is an elevation view of the seat and steering wheel of a vehicle, illustrating the manner in which the cover of FIG. 1 can be removed from the steering wheel without obstructing the operation of the vehicle's controls;

FIG. 3 is a plan view of one side of the cover of the present invention; and

FIG. 4 is a partial plan view of the opposite side of the cover as shown in FIG. 3, illustrating the structure of the portion of the cover which is supported to fit over the steering wheel of the vehicle.

DESCRIPTION OF THE PREFERRED EMBODIMENT

Referring to FIG. 1, there is illustrated the interior of a vehicle, such as an automobile, generally designated by the numeral 10, including a steering wheel assembly 12, gas pedal 14, brake pedal 16, and seats 18. Each seat 18 includes a seat back portion 20 and a head protector element 22. The floorboard 24 of the vehicle 10 extends beneath the seats 18.

The novel protective cover to which this invention is primarily directed is generally designated by the numeral 26 (FIGS. 1, 3) and comprises an elongated cover made of an insulating type material such as terry cloth, aluminized cotton material, or the like. Referring to FIGS. 3 and 4, cover 26 includes a semi-circular rounded end 28 which has a curvature approximating that of a vehicle steering wheel. A flap 30 (FIG. 4) is semi-circular in configuration, and is stitched or otherwise fastened at its periphery to rounded end 28 of cover 26 along stitch line 32. The lower end 34 of flap 30 is not stitched or otherwise attached to cover 26, and a pocket 36 (FIG. 2) is thus formed between flap 30 and the rounded end of cover 26. As seen in FIG. 2, the distance between the rounded end 28 of cover 26 and the lower end 34 of flap 30 is just long enough to extend from the tip of steering wheel 38 to the top of the steering column portion of steering wheel assembly 12.

The remaining extent of cover 26 preferably comprises a single sheet of terry cloth, aluminized cotton material, or other suitable insulating material disposed generally in a rectangular shape. Other shapes can be employed for cover 26 if desired, however, in the preferred embodiment it has been determined that a rectangular configuration for cover 26 is most suitable. Stitching 40 is provided along the sides and bottom of cover 26 to ensure that the cover does not fray or fall apart when in use.

The operation of the novel cover 26 of the present device is as follows. When a vehicle is to be left in the sun for an extended period of time, or in the cold for a like period of time, cover 26 is extended over steering wheel 38 whereby the steering wheel fits into pocket 36 formed between the top of cover 26 and flap 30. Lower end 34 of pocket 36 is located such that it does not interfere with the steering column portion of steering wheel assembly 12 (FIG. 2).

Cover 26 is then extended over seat 18, and along seat back 20. The portion of cover 26 reaching the top of seat back 20 will remain in place in vehicles having fabric seat covers due to the friction between the seat cover and the material comprising cover 26. However, if the seat cover consists of a smooth material, such as leather or vinyl, it may be advantageous to provide alternate means of securing the end of cover 26 to the top of seat back 20.

To this end, the end of cover 26 may be wedged between the top of seat back 20 and the underside of the head protector 22. Or, the portion of cover 26 extending to the top of seat back 20 may include a hook-line fastening means 42, such as marketed under the tradename Velcro. A mating hook-like fastener 44, or the like is attached to the top of seat back 20. When fastener element 42 is brought into contact with fastener 44, cover 26 is held in place over seat back 20 and seat 18, as well as over steering wheel 38, as seen in FIG. 1.

When vehicle 10 remains outside for extended periods of time, such as in hot or cold climates, cover 26 protects steering wheel 38, seat 18, and seat back 20 from extreme temperature changes. Thus, vehicle 10 will be more comfortable to operate.

It may be desirable to have cover 26 remain over seat 18 and seat back 20 while the driver is operating vehicle 10. In this mode of operation, rounded end 28 of cover 26 is lifted such that steering wheel 38 is removed from pocket 36. End 28 is then placed over the edge 46 of seat 18 such that end 28 of cover 26 hangs down in front of seat 18. The dimensions of cover 18 are such that, when in this position (FIG. 2) end 28 hangs straight down over edge 46 of seat 18, and does not interfere in any way with the operation of gas pedal 14, brake pedal 16, or any other controls of vehicle 10. The operator can thus drive vehicle 10 while seated on the portions of cover 26 which extend over seat 18 and seat back 20. After the vehicle has been parked, steering wheel 38 can again be inserted in pocket 36 to protect the steering wheel from the environment. The remaining portions of cover 26 remain in place over seat back 20 and seat 18.

It is apparent that the manufacturing costs for cover 26, as described herein, can be kept relatively low. Therefore, cover 26 can be used as a give-away or premium item by a business concern. For such use, advertising material, such as indicated in FIG. 3, may be imprinted or otherwise applied to the surface of cover 26. In the illustrated embodiment, the advertising material is located on the portion of cover 26 adjacent pocket 36. However, the advertisng material can be placed at any suitable place on the surface of cover 26.

The foregoing detailed description has been given for clearness of understanding only and no unnecessary limitations are to be understood therefrom. Modifications of the present invention may be made by those skilled in the art without departing from the spirit of the invention.

I claim:

1. An apparatus for protecting the steering wheel, seat back, and seat of a vehicle from radical temperature variations comprising: a substantially rectangular piece of insulating material adapted to extend over the seat back and seat of said vehicle and having a first portion extending over the forward edge of said seat, and means to removably secure a second portion of said material to said seat back, said first portion of said material including means to removably receive and partially enclose said steering wheel.

2. The apparatus of claim 1 wherein said first portion of said material is adapted to be removed from receiving said steering wheel and to hang down freely over said forward edge of said seat whereby said first portion does not interfere with the floor mounted control device for said vehicle.

3. The apparatus of claim 1 wherein said means to receive and partially enclose said steering wheel includes a forward edge of said material, and pocket means formed in said forward edge of said material whereby said pocket is adapted to removably fit over and partially enclose said steering wheel.

4. The apparatus of claim 1 wherein said insulating material is selected from the group consisting of terry cloth and aluminized cotton material.

5. The apparatus of claim 3 wherein said forward edge of said material is semi-circular in shape, and said pocket means includes an additional piece of material having a semi-circular leading edge, said leading edges of said two pieces of material being fastened together to form said pocket between said two pieces of material.

6. An apparatus for protecting the steering wheel and seat of a vehicle from radical temperature changes comprising: a piece of insulating material adapted to extend over the seat of said vehicle and having a portion extending over the forward edge of said seat, said portion of material including means to removably receive and partially enclose said steering wheel.

7. The apparatus of claim 6, wherein said portion of material is adapted to be removed from receiving said steering wheel and to hang down freely over said forward edge of said seat whereby said portion of material does not interfere with the floor mounted control devices for said vehicle.

8. The apparatus of claim 6 wherein said means to receive and partially enclose said steering wheel includes a forward edge of said material, and pocket means formed in said forward edge of said material whereby said pocket is adapted to removably fit over and partially enclose said steering wheel.

9. The apparatus of claim 1 wherein said means to removably secure said second portion of said material to said seat back includes first fastening means on one side of said material adjacent the end of said material extending towards the top of said seat back; and second fastening means fixed to said seat back and adapted to mate with said first fastening means and hold said insulating material in position adjacent said seat back.

* * * * *